No. 798,714. PATENTED SEPT. 5, 1905.
F. A. SYLVESTRE.
SODA WATER FAUCET.
APPLICATION FILED OCT. 19, 1904.

WITNESSES:

INVENTOR
Francis A. Sylvestre
BY
Milo B. Stevens and Co.
Attorneys.

UNITED STATES PATENT OFFICE.

FRANCIS A. SYLVESTRE, OF PAWTUCKET, RHODE ISLAND, ASSIGNOR OF ONE-THIRD TO JOSEPH D. R. BRASSARD, OF PAWTUCKET, RHODE ISLAND.

SODA-WATER FAUCET.

No. 798,714. Specification of Letters Patent. Patented Sept. 5, 1905.

Application filed October 19, 1904. Serial No. 229,128.

*To all whom it may concern:*

Be it known that I, FRANCIS A. SYLVESTRE, a citizen of the United States, residing at Pawtucket, in the county of Providence and State of Rhode Island, have invented new and useful Improvements in Soda-Water Faucets, of which the following is a specification.

My invention relates to faucets for soda-water apparatus, and has for its object to provide means for carrying away all surplus or drippings from the faucet, and thus obviate the necessity of frequent mopping of the floor and wiping of the shelf of the fountain.

The invention further contemplates certain improved details of construction, as will appear from the description hereinafter.

Figure 1:
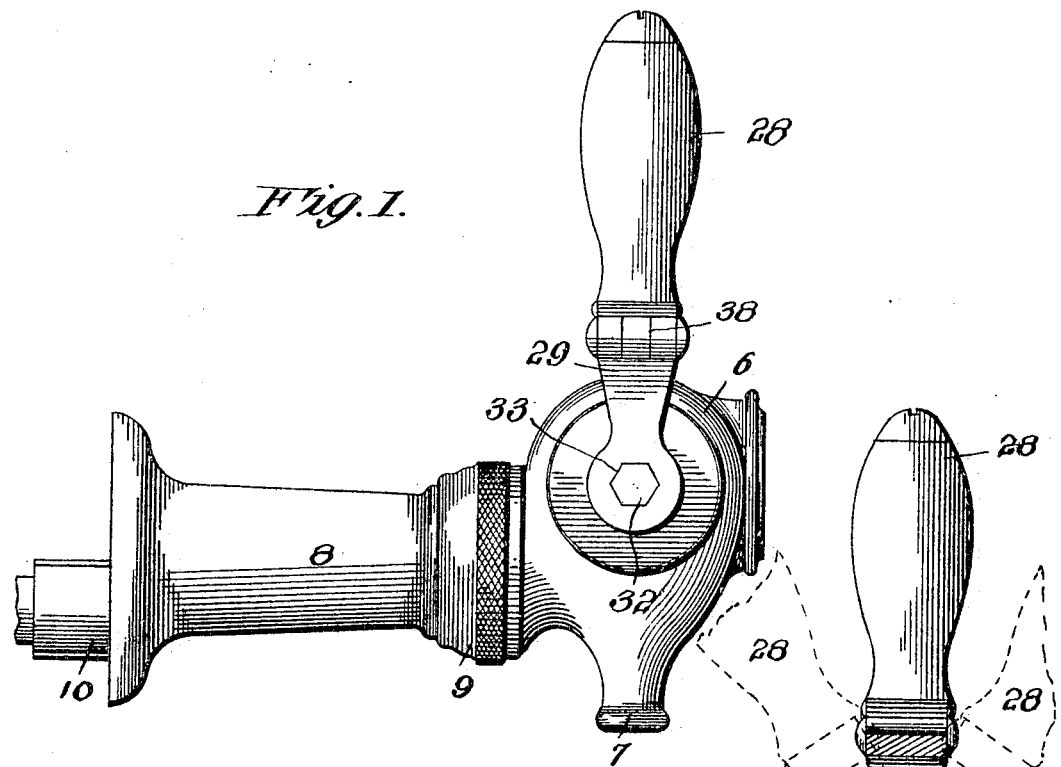
Figure 2:
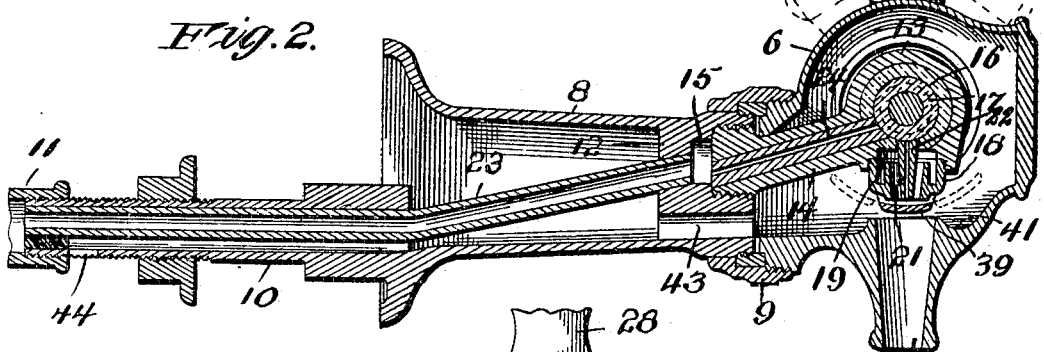
Figure 3:
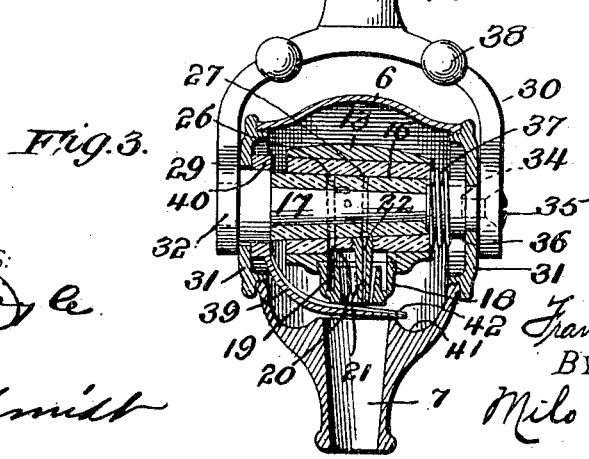

In the accompanying drawings, Figure 1 is an elevation of the invention. Fig. 2 is a longitudinal section thereof. Fig. 3 is a transverse section.

Referring specifically to the drawings, the faucet comprises a bonnet 6, having a discharge-nozzle 7. The bonnet is connected to a tubular shank 8 by means of a coupling 9. The rear end of the shank is reduced, as at 10, and threaded for connection to the fountain-casing, the coupling for the soda-coolers being indicated at 11. A diaphragm 12 is formed in the shank 8 at the front end thereof, to which diaphragm the valve-casing 13 is secured. Said casing has a stem 14, which is threaded and screws into a threaded recess 15 in the diaphragm. The valve-casing has a conical bore 16 to receive the turning-plug 17. A coarse-stream nozzle is indicated at 18, being screwed into a recess 19, formed in the valve-casing. A passage 20 extends from the bore 16 to the recess 19. A fine-stream nozzle is indicated at 21. This is situated within the nozzle 18 and also screws into the valve-casing, having a passage 22, also communicating with the bore 16. The shank 8 has a conduit 23 extending from the coupling 11 to the recess 15. The stem 14 has a passage 24 extending from the recess 15 to the bore 16 and adapted to be placed in communication with the passages 20 and 22, respectively. This is accomplished by the turning-plug 17, fitting in the bore 16 and provided with grooves 26 and 27, respectively. The arrangement of the grooves is such that when the plug is in the position shown in Fig. 2 both nozzles will be closed. When the plug is thrown rearwardly, as shown by dotted lines in Fig. 2, the groove 26 establishes communication between the passages 24 and 20, whereby the coarse-stream nozzle is opened. When the plug is thrown forwardly, as shown by dotted lines in Fig. 2, communication between these passages is broken and the coarse-stream nozzle therefore shut off. At the same time the groove 27 establishes communication between the passages 24 and 22, and thus opens the fine-stream nozzle.

The operating-lever for the plug is shown at 28, being provided with branches 29 and 30, respectively extending on opposite sides of the bonnet 6. The latter has openings in said sides which are closed by screw-caps 31, which can be readily removed and access to the valve thus had. The caps have openings through which the respective ends of the plug 17 extend. The end 32 of the plug is reduced and angular and fits in a correspondingly-shaped opening 33 in the branch 29. The opposite end of the plug has a reduced and threaded end 34, which fits in the opposite branch 30. This end of the plug is tapped to receive the fastening-screw 35, which extends through the branch 30. A nut 36 is screwed on the threaded portion 34 of the plug to regulate the tension of a coiled spring 37, which is confined between said nut and the valve-casing 13. The purpose of this spring is to have the plug work tight, so that when the handle is in position to close the valve it will not accidentally drop to open it. The branches are jointed, as at 38, to permit their being secured to the plug.

The device for catching the drippings comprises a pan 39, having at one side an upward extension 40, which is bored and fitted on the plug 17 outside of the valve-casing, being keyed or otherwise fastened to the plug to turn therewith. When the valve is closed, as shown in Figs. 2 and 3, the pan is under the nozzles 18 and 20 and receives all drippings therefrom. When the valve is opened for either the coarse or fine streams, the pan swings away from the nozzles, as shown by dotted lines in Fig. 2, thus permitting the passage of the soda-water through the nozzles. When the valve is shut, the pan returns to its normal position under the nozzles. A channel or groove 41 is formed in the floor of the bonnet 6 around the upper end of its nozzle 7, and the pan 39 is tilted to one side, as at 42, which side is directly over the channel 41, so that the drippings received by the pan will be discharged thereinto, from whence they flow rearwardly through an opening 43 in the diaphragm 12 and through the tubular shank 8 and its reduced end 10. The drippings finally pass out through an outlet or opening 44 in the part 10, being received by a suitable receptacle.

Having thus described my invention, what is claimed as new, and desired to be secured by Letters Patent, is—

1. A faucet provided with a delivery-nozzle and having a bonnet provided with a channel independent of said nozzle; means to conduct drippings from the faucet into the channel; and an outlet to discharge the drippings from said channel.

2. A faucet provided with a delivery-nozzle and having a bonnet provided with a channel independent of said nozzle; a drip-pan discharging into said channel, said drip-pan being constructed and connected to move from under the faucet when the same is opened and returning when it is closed; and an outlet from the channel.

3. A faucet comprising a bonnet having a discharge-nozzle and a shank having a channel communicating with an outlet; a valve in the bonnet; a drip-pan under the discharge-nozzle of the valve and discharging into the channel, said drip-pan being secured to the valve-operating means and movable therewith from the valve-nozzle when the valve is opened and returning when it is closed.

4. A faucet comprising a bonnet having a discharge-nozzle and a channel communicating with an outlet; a valve-casing in the bonnet, said valve-casing having a turning-plug and a discharge-nozzle; a drip-pan under said nozzle, said drip-pan being secured to the plug and movable therewith from the nozzle when the plug is turned to open the valve, and returning when the valve is closed.

In testimony whereof I have signed my name to this specification in the presence of two subscribing witnesses.

FRANCIS A. SYLVESTRE.

Witnesses:
LESLIE M. GOODWIN,
ALFRED O. MAKEE.